United States Patent
Chen et al.

(10) Patent No.: US 12,551,194 B2
(45) Date of Patent: Feb. 17, 2026

(54) IMAGE PROCESSING METHOD FOR MULTI-FREQUENCY ULTRASOUND PROBE DEVICE

(71) Applicant: Hong Kong Applied Science and Technology Research Institute Company Limited, Hong Kong (HK)

(72) Inventors: Rihong Chen, Hong Kong (HK); Hanqiang Huang, Hong Kong (HK)

(73) Assignee: Hong Kong Applied Science and Technology Research Institute Company, Hong Kong (HK)

( * ) Notice: Subject to any disclaimer, the term of this patent is extended or adjusted under 35 U.S.C. 154(b) by 336 days.

(21) Appl. No.: 18/480,313

(22) Filed: Oct. 3, 2023

(65) Prior Publication Data

US 2025/0107781 A1 Apr. 3, 2025

(51) Int. Cl.
 A61B 8/00 (2006.01)
 G06T 1/20 (2006.01)

(52) U.S. Cl.
 CPC .......... *A61B 8/5238* (2013.01); *A61B 8/5269* (2013.01); *G06T 1/20* (2013.01)

(58) Field of Classification Search
 None
 See application file for complete search history.

(56) References Cited

U.S. PATENT DOCUMENTS

| | | | | |
|---|---|---|---|---|
| 7,717,851 | B2* | 5/2010 | Karasawa | A61B 8/4488 600/447 |
| 9,060,670 | B1* | 6/2015 | Boctor | A61B 8/085 |
| 10,497,477 | B2 | 12/2019 | Song et al. | G16H 50/50 |
| 10,905,401 | B2* | 2/2021 | Li | A61B 8/5207 |
| 12,178,640 | B2* | 12/2024 | Martin | A61B 8/5246 |
| 2011/0230766 | A1 | 9/2011 | Medlin | 600/459 |
| 2012/0197113 | A1* | 8/2012 | Courtney | A61B 8/445 600/447 |
| 2014/0114189 | A1* | 4/2014 | Kanayama | G01S 7/52036 600/443 |
| 2016/0015417 | A1* | 1/2016 | Burdette | A61B 8/085 606/27 |
| 2016/0143617 | A1 | 5/2016 | Ebbini et al. | A61B 8/14 |
| 2018/0000452 | A1* | 1/2018 | Adams | G01S 7/52095 |
| 2019/0008485 | A1* | 1/2019 | Li | G01S 15/8952 |
| 2019/0133550 | A1* | 5/2019 | Liu | A61B 8/14 |
| 2019/0133557 | A1 | 5/2019 | Liu et al. | A61B 8/5246 |

(Continued)

FOREIGN PATENT DOCUMENTS

| | | | | |
|---|---|---|---|---|
| CN | 111667447 | * | 9/2020 | G06K 9/62 |
| CN | 113317873 A | | 8/2021 | |
| CN | 113633314 A | | 11/2021 | |

OTHER PUBLICATIONS

International Search Report mailed May 22, 2024, issued to International Application No. PCT/CN2023/123738.

(Continued)

*Primary Examiner* — Beniyam Menberu
(74) *Attorney, Agent, or Firm* — Stein IP LLC (57) ABSTRACT

A method for processing multiple image data sets, each image data set generated by a different ultrasound frequency emitter, to obtain a single merged image data set for use to display a single merged image. The method can also include steps to account for non-ideal alignment between the different ultrasound frequency emitters.

16 Claims, 7 Drawing Sheets

(56) References Cited

U.S. PATENT DOCUMENTS

| | | | |
|---|---|---|---|
| 2021/0228188 A1 | 7/2021 | Sasaki et al. | A61B 8/5246 |
| 2022/0409185 A1* | 12/2022 | Tanaka | G01S 7/52026 |
| 2023/0248337 A1* | 8/2023 | Meral | G01S 7/52047 |
| | | | 600/443 |

OTHER PUBLICATIONS

Written Opinion of the International Searching Authority mailed May 22, 2024, issued to International Application No. PCT/CN2023/123738.

* cited by examiner

IMAGE PROCESSING METHOD FOR MULTI-FREQUENCY ULTRASOUND PROBE DEVICE

BACKGROUND OF THE INVENTION

1. Field of the Invention

The proposed invention is related to a method for processing ultrasonic imaging based on an embedded SoC for digestive tract miniature ultrasonic probe diagnosis system.

2. Description of the Related Art

Ultrasonic imaging by sending out ultrasonic sound waves and then receiving echoes of the sound waves to construct an image is known in the art. It is a specialized form of medical ultrasound, itself descended from the principles of active sonar. For purposes of this application, when a system or method is referred to as "ultrasound," it will mean medical ultrasound imaging, unless it is clear from context or specified otherwise that some other meaning is used.

Ultrasound systems use a probe which functions as a transducer—the probe emits ultrasonic sound waves, and then detects the waves when they return from reflecting off a surface (or multiple layers of an object.) As with all active energy reflection/detection systems, the time it takes for the waves to return indicates distance, and the amplitude of the echo wave is related to the difference in the acoustic impedance of the reflecting surface, resulting in a change in measured voltage in a corresponding echo electrical signal. The energy of ultrasonic waves will gradually decrease as they travel through the medium. Different media have different attenuation coefficients, typically given in units of dB/cm/MHz, which results in ultrasonic high-frequency energy attenuating relatively quickly, and ultrasonic low-frequency energy attenuating relatively slowly.

Traditional miniature-probe-based ultrasound endoscope probe systems use single-frequency probes. These devices are relatively complex and costly. They can be used to acquire images with either relatively higher image resolution using a higher-frequency probe or relatively deeper image depth with a lower frequency probe, but not both. A method which utilizes a dual/triple probe to improve the image quality related to relative ultrasound resolution and depth would be a useful invention. A method which can reduce the complexity and cost of an ultrasound system would be a useful invention.

SUMMARY OF THE INVENTION

The method of the invention allows an ultrasound system to generate a higher-resolution image by generating ultrasound using multiple frequencies and applying an appropriate image processing algorithm to the received echoed ultrasonic wave data (referred to as "raw data", "signal", "scanline" or "A-mode scanline") with dynamic filters applied to different segments of raw data at different depth-ranges and processing the raw data to obtain a final fusion result. "Dynamic filters" refers to different bandpass filters with a specified bandwidth, and different center frequencies.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENTS

Reference will now be made in detail to the present embodiments of the present invention, examples of which are illustrated in the accompanying drawings, wherein like reference numerals refer to the like elements throughout. The embodiments are described below in order to explain the present invention by referring to the figures.

Persons of ordinary skill in the art will note that ultrasonic imaging can be applied to a wide variety of materials other than biological structures. The preferred embodiment of the method will be described in terms of a medical diagnostic ultrasound imaging device. However, the claims will cover an appropriate range of applications of the invention. The usefulness of the invention is by no means limited to such medical diagnostic uses.

Figure 1:
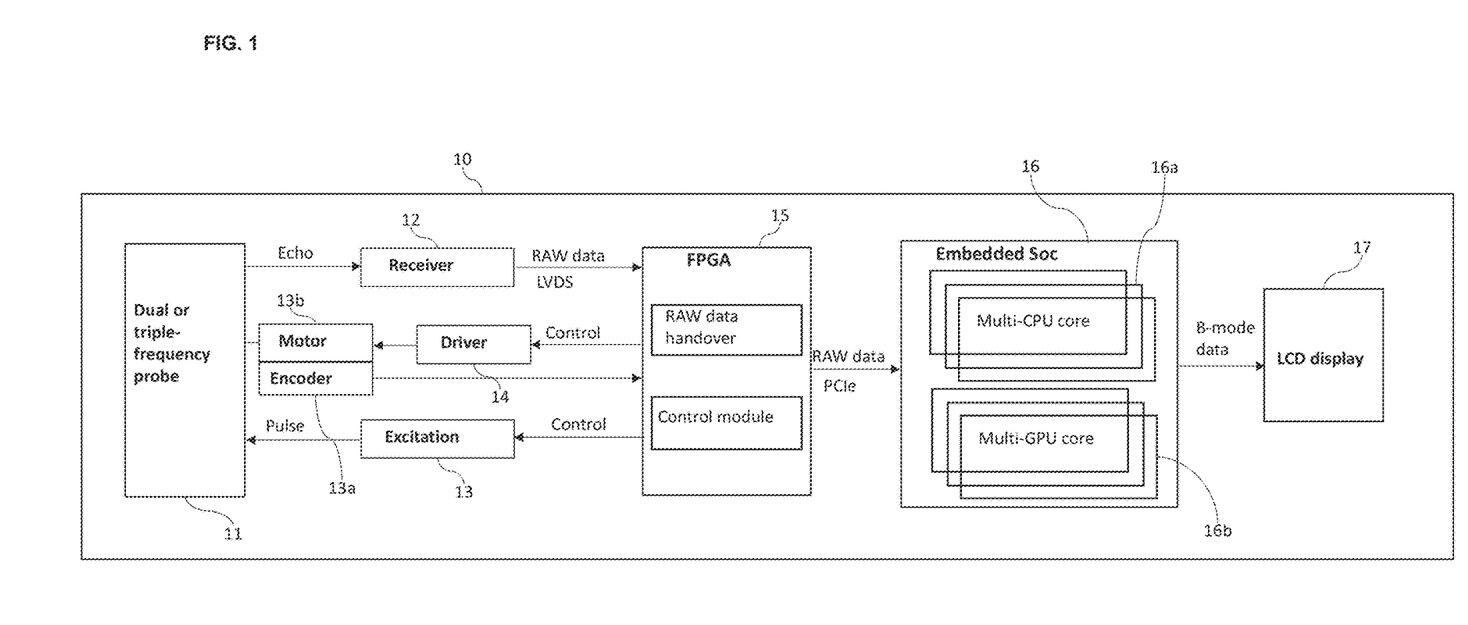
FIG. 1 is an abstract schematic of a device enabling the method of the invention.

By referring to FIG. 1, the basic principles of the invention may be easily understood. Ultrasound imaging system 10 includes dual/triple frequency probe 11 (hereafter, "probe"). The transducer is built into probe 11. The ultrasound imaging system includes excitation component 13 and receiver component 12. The excitation component 13 sends a high-voltage pulse to probe 11, which converts the electrical signal into an ultrasonic signal. The target being tested (not shown) reflects the ultrasonic signal, which is then converted into an echo electrical signal by the probe and sent to receiver component 12. The probe rotating component consists of encoder 13a and motor 13b. Motor 13b receives control signal and motor power from driver module 14, while encoder 13a returns a signal of probe rotation angle to FPGA module 15.

When the ultrasonic waves encounter the object to be analyzed, a portion of them are absorbed, and a portion of them are reflected. The reflected portion, traveling at the speed of sound in the surrounding medium, will disperse according to general physical principles, and some portion of the energy thereof will in turn encounter the receiver 12 and thus be detected by probe 11. If the object is moving relative to the probe (or vice versa) the frequency of the ultrasonic waves will shift due to the Doppler effect. The method may or may not take this into account depending on how dynamic an image is desired. It is required that the method allow for at least some level of frequency shift/clustering as will be apparent in later description.

The receiver 12 generates raw data which is sent to FGPA 15. FGPA 15 sends the raw data to System-On-A-Chip (or SoC) 16, which includes a multi-CPU core 16a and a multi-GPU core 16b. After processing according to the method of the invention, processed image data (or "B-mode data,") is sent to display 17 to be viewed by a doctor, nurse, medical technician, or other user. The B-mode data may also be printed, electronically stored, and/or transmitted to a remote location for later review or further processing. FPGA 15 also sends the control signals to driver 14 during operation, controlling both the excitation and receiver components. It is possible for some or all of the integrated components shown in FIG. 1 to be separated into multiple components, but it is preferred for reasons of economy and size to use integrated components as shown.

The use of the FPGA in combination with an SoC, as opposed to traditional complex system architecture, produces additional improvements over the prior art, including the ability to use standardized Compute Unified Device Architecture (CUDA) API/algorithms with standard GPU cores, embed imaging algorithms, embed echo pre-processing and post-processing algorithms, additional flexibility and real-time performance, along with a more compact and less costly overall construction.

Figure 2:
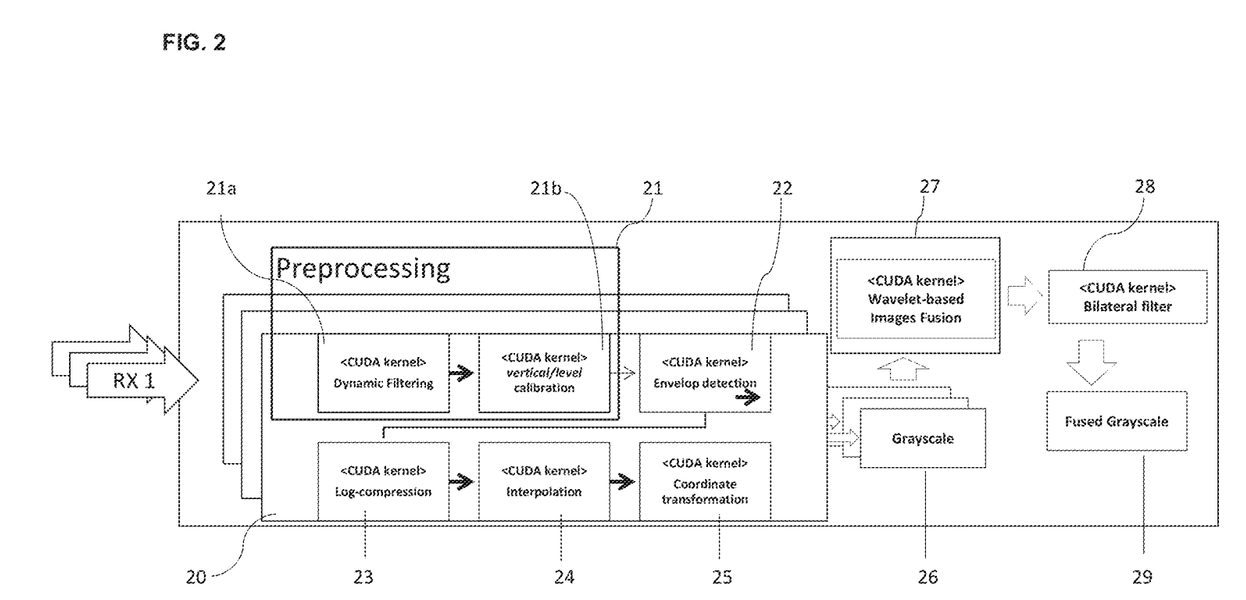
FIG. 2 is an abstract flow diagram of the method of the invention.

FIG. 2 shows the flow of the method of the invention. Each "step" of the flow corresponds to one or more algorithms designed to process raw data or the data produced by the previous step, which is then used in the next step(s). Processing block 20 contains preprocessing steps 21, envelope detection step 22, log-compression step 23, interpolation step 24, and coordinate transformation step 25. In preprocessing steps 21, the raw data corresponding to each frequency emitted and detected by probe 11 and provided by FPGA 15 (see FIG. 1) to SoC 16 is run through a dynamic filter step 21a (see FIGS. 3 and 4 for more detail) to produce prefiltered data, the prefiltered data is run through a calibration step 21b to adjust for less than ideal calibration of the device (see FIG. 5) and the prefiltered, calibrated data for each frequency used by the method is then run through an envelope detection step 22 (see FIGS. 3 and 4) producing a number of preprocessed data sets, each of the preprocessed data sets corresponding to one of the frequencies used. Each of the set of preprocessed data sets is in turn run through log-compression step 23, interpolation step 24, and coordinate transformation step 25, producing a number of processed data sets, each processed data set corresponding to a frequency used by probe 11 and being translatable into one of a set of single-frequency grayscale images 26. Log-compression, interpolation, and coordinate-transformation are well-known mathematical operations known in the image processing art and are not further defined herein.

The individual processed data sets (and/or single-frequency grayscale images) are further processed by wavelet-based image fusion step 27, producing a wavelet-fused data set (and/or wavelet-fused grayscale image.) (See FIGS. 6 and 7.) The wavelet-fused data set is then run through a bilateral filter step 28, producing a fused data set (and/or fused grayscale image.) All references to "wavelet fusion" or "wavelet-based fusion" in this application refer to a process of applying an appropriate wavelet transform algorithm to the data to achieve a desired fusion based upon analysis of the frequencies of the echo data treated as wavelets.

Figure 3:
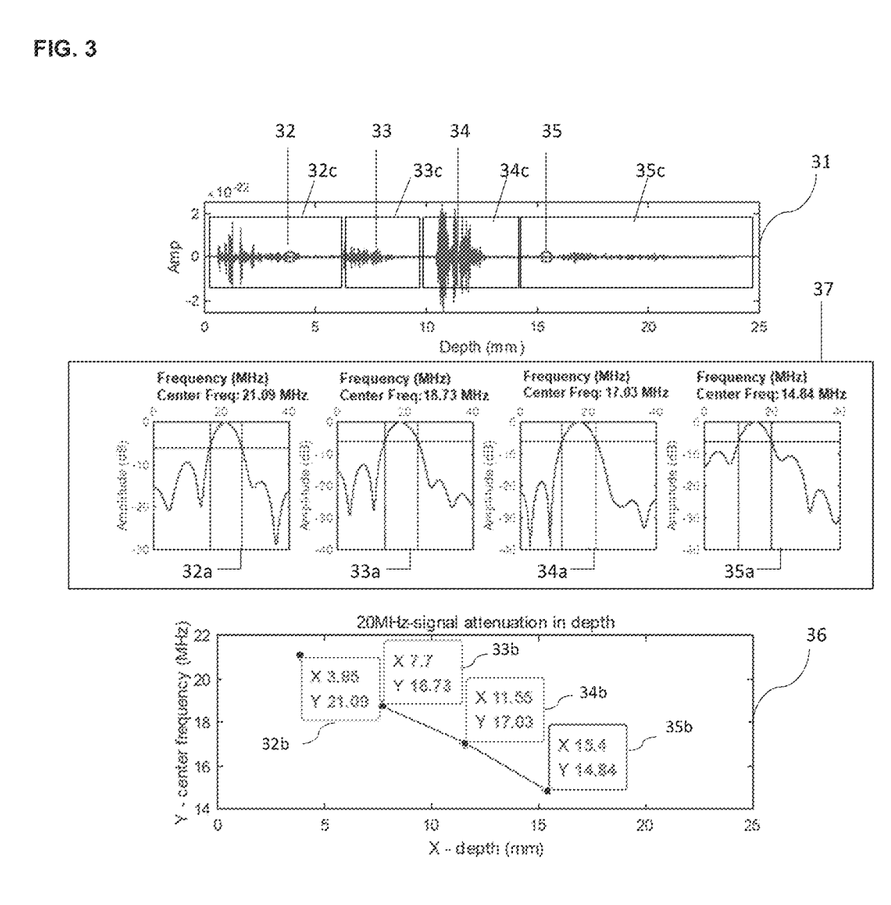
FIG. 3 is a graphical representation of signal data as processed by the method of the invention.

FIG. 3 takes a scanline from a 20 MHz transducer as an example to illustrate ultrasonic energy attenuation: the ultrasonic energy will gradually decrease when it is transmitted in the medium. Different target materials will correspond to different attenuation coefficients, typically described in units of dB/cm/MHz. In general, when ultrasound is transmitted in a medium, high-frequency energy attenuates faster than that of the low-frequency. Graph 31 is a complete A-mode scanline. At the depth positions of 32, 33, 34 and 35, corresponding to the depths of 3.85 mm, 7.7 mm, 11.55 mm, and 15.4 mm, small segments of signals are selected for spectrum analysis to obtain spectrograms 32a, 33a, 34a, and 35a. From 32a, 33a, 34a, and 35a, the −6 dB center frequencies of these 4 small segments are respectively 21.09 MHz, 18.73 MHz, 17.03 MHz, and 14.84 Mhz. Combining the depth values with the corresponding −6 dB center frequencies, graph 36 is obtained. Graph 36 shows that in a scanline (A-mode line), the segment that comes from a relatively shallower layer of the medium is the higher-frequency signal. The segment that comes from the relatively deeper layer of the medium is the lower-frequency signal. The above rules also apply to the scan lines acquired by other frequency transducers (12 MHz, 20 MHz, et cetera.) In view of the distribution characteristics of the center frequency in the scanline, the present invention logically divides the scanline into multiple segments (greater than or equal to 2, shown in graph 31 corresponding to 4 segments) in a preprocessing phase, and applies center-frequency-matched bandpass filters to different segments from different depth. This process constitutes "dynamic filtering." For purposes of this application a 20 MHz signal and a 12 MHz signal will be discussed, but there are no limits other than that a frequency separation adequate to ensure reasonable separability in the dynamic filtering step must be used.

In the prior art, a single filter was used for the entire scan line, which resulted in indiscriminate signal filtering and the attenuation of the received echo data. Using dynamic filters for echoes from different depths, based on the center frequencies associated with each level of depth and initial signal frequency, results in improvement in signal-to-noise ratio ("SNR") and improvement in detection depth.

Figure 4:
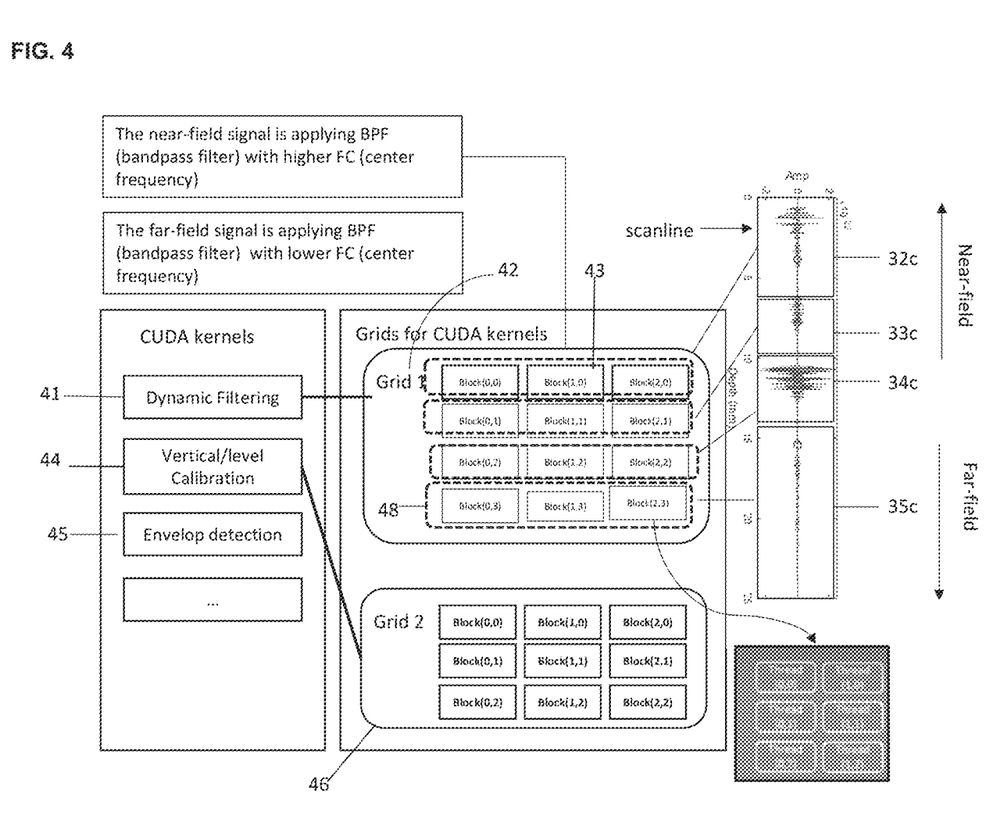
FIG. 4 is an abstract schematic of a portion of a device enabling the method of the invention.

FIG. 4 shows an abstracted schematic of a device implementing the dynamic filtering step of the method of the invention. SoC 16 uses standard CUDA algorithms/API in association with the multi-GPU cores 16b to perform the steps of the invention. One of the defined CUDA kernels is dynamic filtering kernel 41, which tasks will be executed in parallel by multiple threads in corresponding grid 42 in the GPU. The near-field signal, corresponding to a shallower depth (e.g., segment 32c in FIG. 3) is run through a bandpass filter corresponding to a relatively higher center frequency as it should produce better SNR. The far-field signal, corresponding to a deeper depth (e.g., segment 35c in FIG. 3) is run through a bandpass filter corresponding to a relatively lower center frequency as it should produce better SNR.

After the data is dynamically filtered, it is then sent on as described above to the vertical/level calibration kernel 44, which tasks will be executed in parallel by multiple threads in a corresponding vertical/level calibration grid 46 in the GPU. Considering the execution efficiency, the CUDA grid for vertical/level calibration will also have a block grouping according to some empirical values. The other CUDA kernels, like envelope detection kernel 45, will also have their own block grouping according to some other empirical values.

Figure 5:
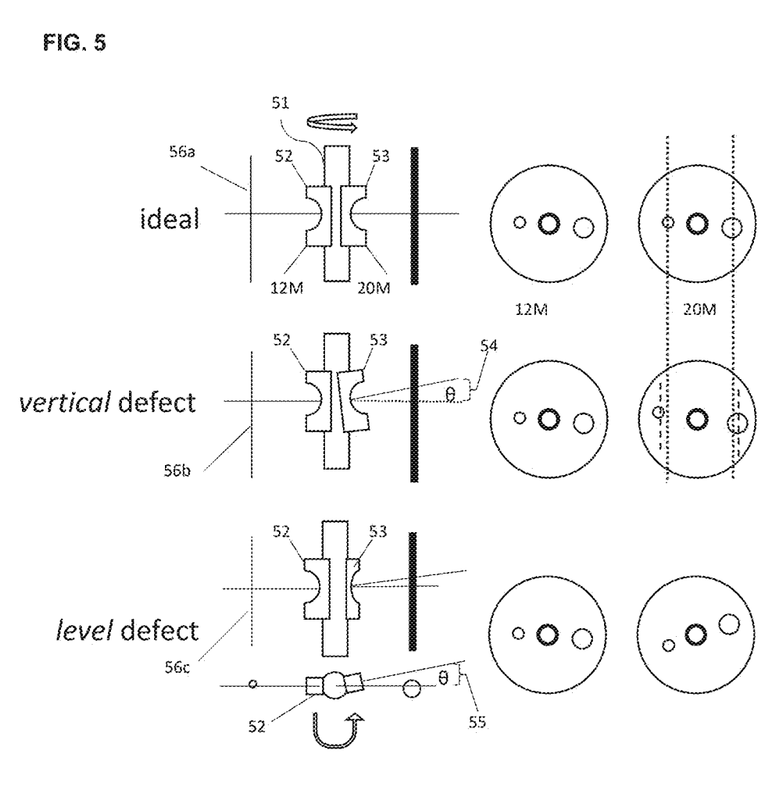
FIG. 5 is a probe assembling error view of an abstract version of a probe used in the method of the invention.
Figure 6:
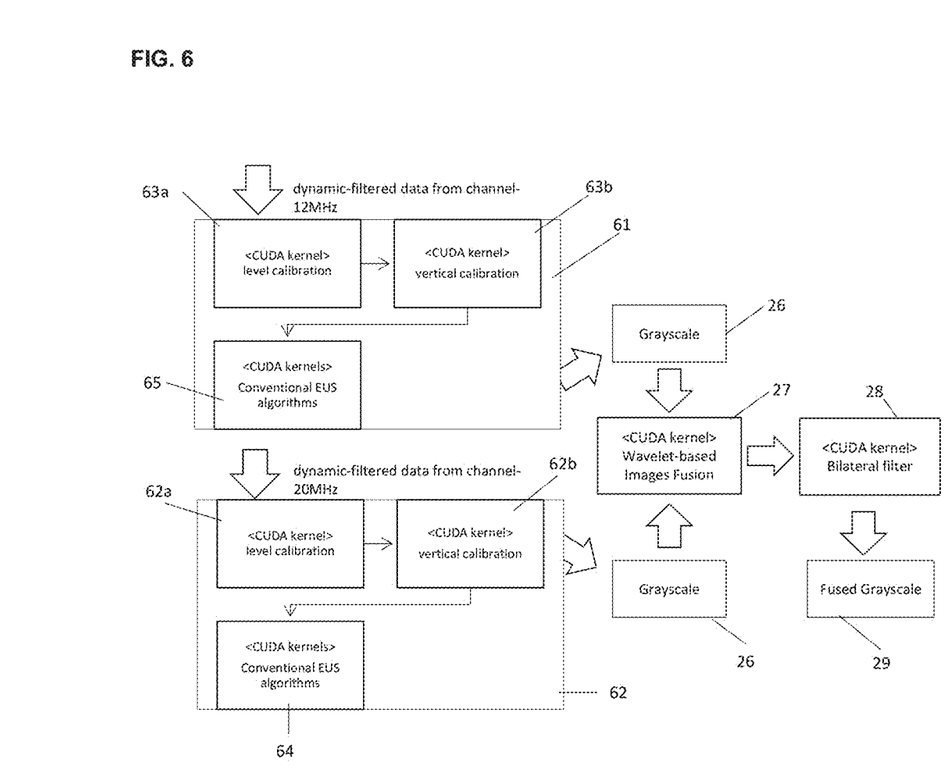
FIG. 6 is an abstract flow diagram of the method of the invention applied to multiple frequencies including calibration steps.

FIG. 5 shows an abstracted probe emitter and the related information which is used in the calibration step (see FIG. 6). Low-frequency emitter 52 and high-frequency emitter 53 are integrated into probe 51 (corresponding to excitation module 13 of probe 11 as shown in FIG. 1.) Ideally, the emitters would be perfectly aligned as in configuration 56a. However, in practice, eventually the emitters will be out of their ideal alignment. The major defects in alignment are vertical defects as in configuration 56b, where the emitters are vertically misaligned by vertical defect angle 54, and level defects as in configuration 56c, with a difference of level defect angle 55. Combining the level defect angle and the vertical defect angle gives a combined defect angle.

It is preferred that if a dual-frequency probe is used, it has two elements, and that they be placed "back-to-back," or at a 180-degree angle from each other. If a triple-frequency probe is used, it has three elements, and it is preferred that they be placed at 120-degree angles from each other. If more emitters are used, they should likewise be equally distributed in the plane of the probe.

Figure 7:
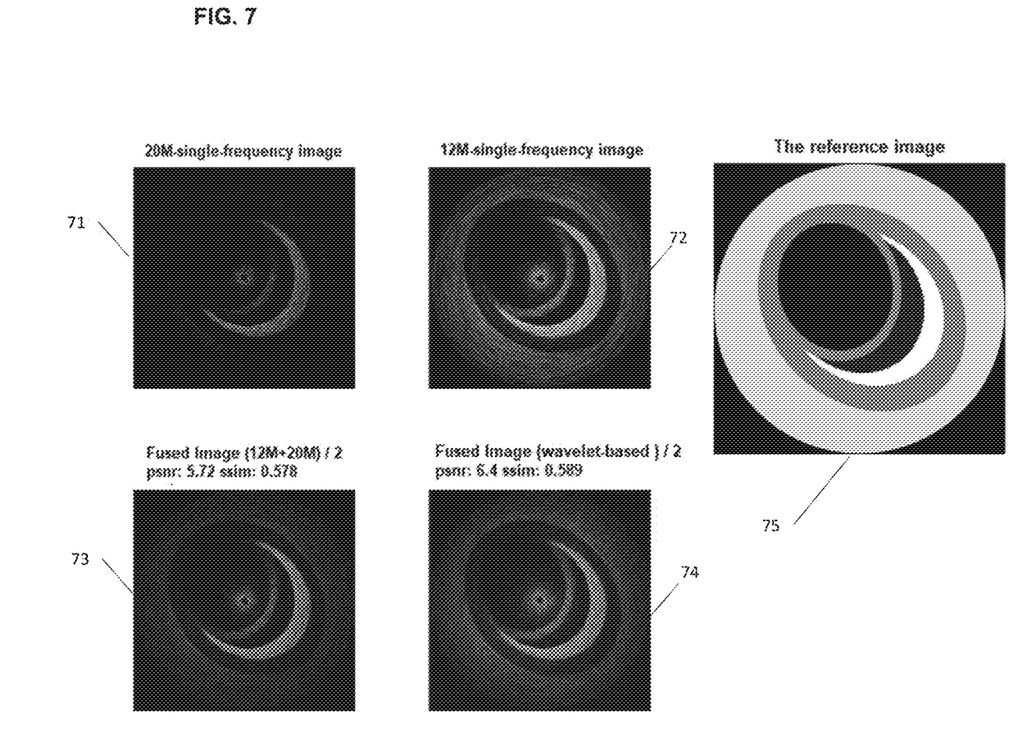
FIG. 7 is a sequence of abstracted sample images and an abstract object to be analyzed at various stages of the implementation of the method of the invention.

FIG. 6 shows the steps of calibrating for vertical and level defects and then using the result to complete the method. Dynamic filtered data from the 12 MHz data set is fed into a first CUDA level defect step 63a which compensates for level defect angle 55 and a first CUDA vertical defect step 63b which compensates for vertical defect angle 54. Similarly, filtered data from the 20 MHz data set is fed into a second CUDA level defect step 62a which compensates for level defect angle 55 and a second CUDA vertical defect step 62b which compensates for vertical defect angle 54. In either case, the results are then processed with standard Endoscopic Ultrasound (or "EUS") algorithms in first CUDA EUS step 65 and second CUDA EUS step 64. These steps produce single-frequency grayscale images 26, which are then processed with CUDA wavelet-based fusion step 27 and CUDA bilateral filter step 28 to produce fused grayscale image 29. The grayscale images 26 correspond to far-field image 72 (for the 12 MHz data) and near-field image 71 (for the 20 MHz data) as shown in FIG. 7. The fused grayscale image 29 corresponds to wavelet-based fusion image 74 as shown in FIG. 7.

FIG. 7 shows examples of actual images generated with the prior art and the method of the invention relative to a reference object. 20 MHz single-frequency image 71, shows the result with shallower detection on the reference phantom 75. 12 MHz single-frequency image 72, shows the result with deeper detection on the reference phantom 75. Standard fused image 73 shows the result of fusing the single-frequency images without the wavelet-fusion based method of the invention. Wavelet-fused image 74 shows the result of fusing the single-frequency images with the wavelet-based method of the invention. There is more detail, and the edges of tissues are sharper. In terms of both peak signal-to-noise ratio (PSNR) and structural similarity index (SSIM) analysis, the wavelet-based fusion images are superior to the results of the prior art.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A method for processing ultrasonic imaging using a multi-frequency probe device, comprising the steps of:
    acquiring a first set of ultrasound raw data from a first frequency emitter on the multi-frequency probe device;
    acquiring a second set of ultrasound raw data from a second frequency emitter on the multi-frequency probe device, wherein the first set of ultrasound raw data and the second set of ultrasound raw data are filtered dynamically as they are acquired to account for at least two signal segments of a scanline divided at one or more depth-points to be analyzed;
    processing the first set of ultrasound raw data using one or more GPU cores on a multi-GPU core set, the multi-GPU core set being part of a system on a chip device to generate a first image data set;
    processing the second set of ultrasound raw data using one or more GPU cores on the multi-GPU core set in parallel with the processing of the first set of ultrasound raw data to generate a second image data set;
    determining a vertical defect angle between the first frequency emitter and the second frequency emitter;
    determining a level defect angle between the first frequency emitter and the second frequency emitter;
    applying a vertical calibration algorithm to the first set of ultrasound raw data and the second set of ultrasound raw data to correct for the vertical defect angle;
    applying a level calibration algorithm to the first set of ultrasound raw data and the second set of ultrasound raw data to correct for the level defect angle;
    fusing the first image data set and the second image data set to generate a fused image data set;
    using the fused image data set to generate a fused image; and
    displaying the fused image on a display for review by a user.

2. The method of claim 1, wherein the fused image data set is generated by applying a wavelet transform algorithm to the first and second data sets.

3. The method of claim 2, further comprising the steps of:
    applying a speckle-noise suppression algorithm to the fused image data set.

4. The method of claim 3, wherein there are an arbitrary number of frequency emitters which each generate a corresponding set of ultrasound raw data, and the corresponding sets of raw data are each processed in parallel on the multi-GPU core set and fused to create the fused image data set.

5. The method of claim 2, wherein the first set of ultrasound raw data and the second set of ultrasound raw data are filtered dynamically as they are acquired to account for two or more-signal segments of a scanline divided at one or more depth-points to be analyzed.

6. The method of claim 5, wherein a bandpass filter with a higher center-frequency is applied to the first set of ultrasound raw data and a second bandpass filter with a lower center-frequency is applied to the second set of ultrasound raw data when dynamically filtering the first set of ultrasound raw data and the second set of ultrasound raw data.

7. The method of claim 6, wherein there are an arbitrary number of frequency emitters which each generate a corresponding set of ultrasound raw data, and the corresponding sets of raw data are each processed in parallel on the multi-GPU core set and fused to create the fused image data set.

8. The method of claim 5, wherein there are an arbitrary number of frequency emitters which each generate a corresponding set of ultrasound raw data, and the corresponding sets of raw data are each processed in parallel on the multi-GPU core set and fused to create the fused image data set.

9. The method of claim 2, wherein there are an arbitrary number of frequency emitters which each generate a corresponding set of ultrasound raw data, and the corresponding sets of raw data are each processed in parallel on the multi-GPU core set and fused to create the fused image data set.

10. The method of claim 1, wherein a bandpass filter with a higher center-frequency is applied to a first signal segment of the scanline and a second bandpass filter with a lower center-frequency is applied to a second segment of the scanline when dynamically filtering the first set of ultrasound raw data and the second set of ultrasound raw data.

11. The method of claim 1, wherein the first frequency emitter is placed back-to-back with the second frequency emitter.

12. The method of claim 11, wherein there are an arbitrary number of frequency emitters which each generate a corresponding set of ultrasound raw data, and the corresponding sets of raw data are each processed in parallel on the multi-GPU core set and fused to create the fused image data set.

13. The method of claim 1, further comprising the steps of:
    acquiring a third set of ultrasound raw data from a third frequency emitter on the multi-frequency probe device;
    processing the third set of ultrasound raw data using one or more GPU cores on a multi-GPU core set in parallel with the processing of the first set of ultrasound raw data and the second set of ultrasound raw data to generate a third image data set; and
    fusing the first image data set, the second image data set, and the third image data set to generate the fused image data set.

14. The method of claim 13, wherein the first frequency emitter, the second frequency emitter, and the third frequency emitter are at an angle of 120 degrees to each other in the plane of the multi-frequency probe device.

15. The method of claim 1, further comprising the steps of:
    applying an envelope detection algorithm to the first set of ultrasound raw data and the second set of ultrasound raw data;
    applying a log-compression algorithm to the first set of ultrasound raw data and the second set of ultrasound raw data;
    applying an interpolation algorithm to the first set of ultrasound raw data and the second set of ultrasound raw data; and
    applying a coordinate transformation algorithm to the first set of ultrasound raw data and the second set of ultrasound raw data.

16. The method of claim 1, wherein there are an arbitrary number of frequency emitters which each generate a corresponding set of ultrasound raw data, and the corresponding sets of raw data are each processed in parallel on the multi-GPU core set and fused to create the fused image data set.

* * * * *